Nov. 4, 1952 J. M. LITTLE ET AL 2,616,389
WEIGHING SCALE INDICIA ILLUMINATOR
Filed May 2, 1949 2 SHEETS—SHEET 1
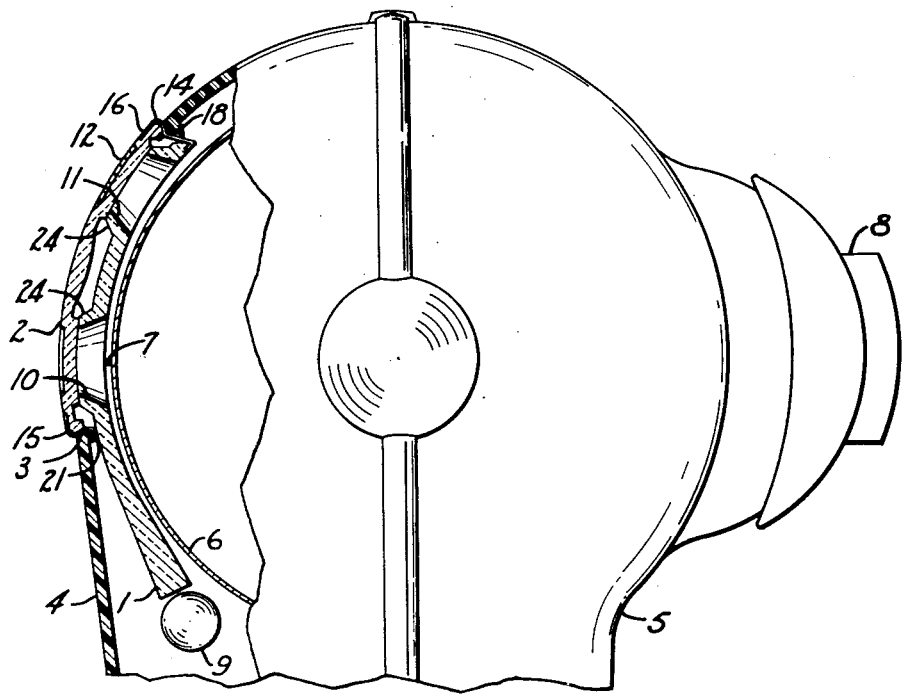
Fig. I
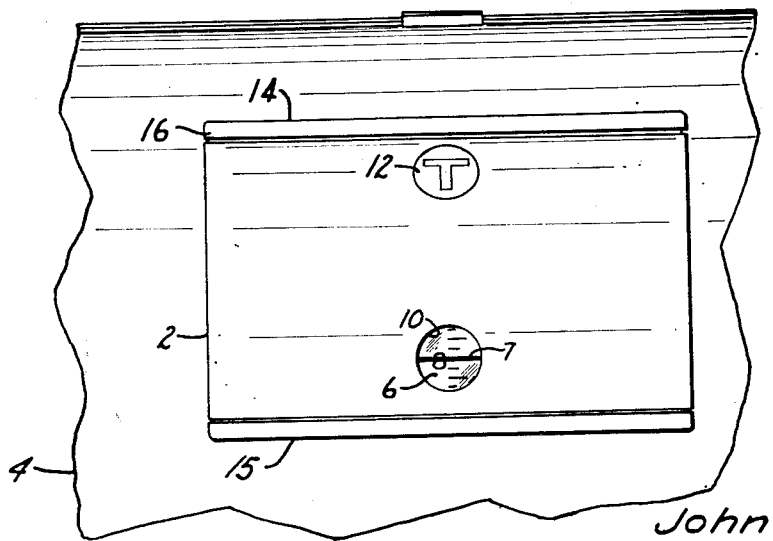
Fig. II
INVENTORS
John M. Little
BY Cecil G. Blank
Marshall, Marshall & Leonard
ATTORNEYS

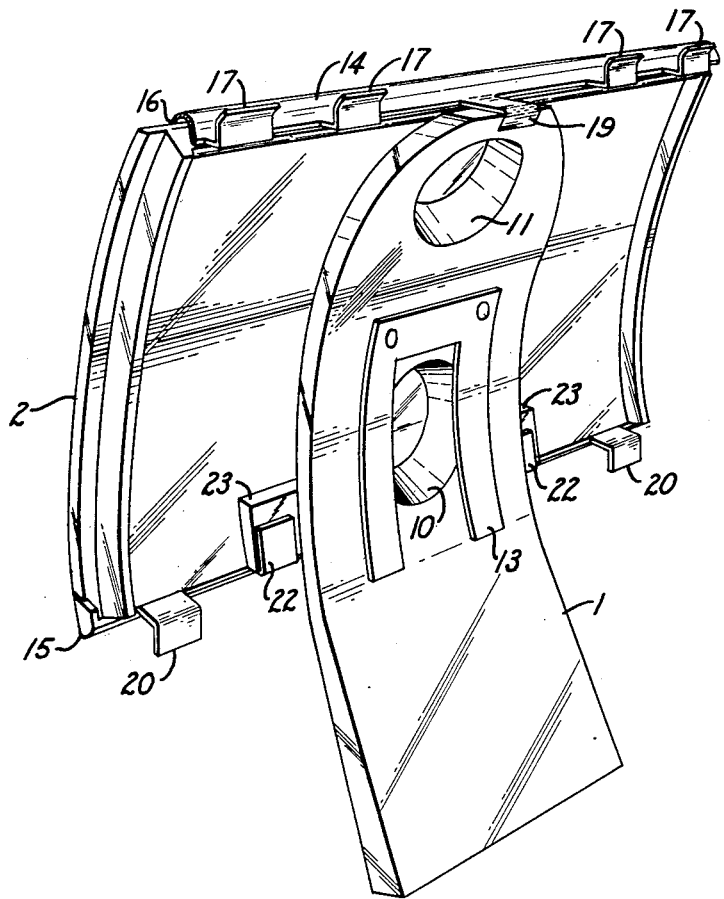
Fig. III
INVENTORS
John M. Little
BY Cecil G. Blank
Marshall, Marshall & Leonard
ATTORNEYS Patented Nov. 4, 1952

2,616,389

UNITED STATES PATENT OFFICE 2,616,389

WEIGHING SCALE INDICIA ILLUMINATOR

John M. Little and Cecil G. Blank, Toledo, Ohio, assignors to Toledo Scale Company, Toledo, Ohio, a corporation of New Jersey Application May 2, 1949, Serial No. 90,889

4 Claims. (Cl. 116—129)

This invention relates to cylindrical chart weighing scales and in particular to an improved arrangement for illuminating the indicia viewed from the customer's side of the scale.

It is desirable, for appearance, that the housing of a cylindrical chart weighing scale, particularly on the customer's side, conform closely to the outline of the cylindrical chart itself. Such an arrangement, however, makes it generally impossible, because of the close spacing between the chart itself and the chart housing, to locate light bulbs in position to directly illuminate the indicia at the customer's reading line.

The principal object of this invention is to provide a simplified structure for carrying light from a light bulb located in an uncrowded portion of the chart housing to illuminate those areas of the chart that are viewed by the customer.

Another object of the invention is to provide an illuminated reading point and an illuminated identifying or decorative device in interchangeable positions on the customer's side of the weighing scale.

More specific objects and advantages are apparent from the following description of a preferred embodiment of the invention.

According to the invention a molded, transparent, plastic piece is shaped to conform closely to the cylindrical surface of a rotatable weighing scale chart and is mounted from a wall of the housing of the scale so that it is positioned in the space between the housing and the chart. An end of the molded plastic material that is finished smooth and square is presented directly to an elongated light bulb. The molded transparent plastic material serves as a light track and by internal reflection from its polished surfaces causes the light from the light source to travel within the plastic throughout its full length and breadth. At least one tapered hole is cut through the plastic piece, the hole overlying the desired reading area of the chart. In the example shown two such holes are cut through the plastic since two reading areas are alternatively used depending upon the height at which the weighing scale is to be installed. These tapered openings through the transparent pieces open toward the chart and the beveled edges are sharp enough with respect to the path of light through the plastic material so that light spills through these surfaces onto the desired areas. A front cover plate forming part of the housing of the scale and overlying the reading areas is provided with a transparent section over each of the reading areas. One such section is left open for weight indications and the other such section is closed by a translucent decorative piece which besides being decorative may also display the manufacturer's trade-mark. These openings are the same in size and shape so that either opening may be used for either function.

For a clearer understanding of the cooperation between the parts of the improved lighting arrangement references may be had to the following description and to the drawings illustrating the invention.

In the drawings:

Figure I is a fragmentary end elevation, partly in section, of a weighing scale incorporating the improved lighting arrangement.

Figure II is a fragmentary elevation of the scale as seen from the customer's side.

Figure III is an isometric view of the lighting arrangement disassembled from the light source and weighing scale housing.

These specific figures and the accompanying description are intended merely to illustrate the invention but not to limit its scope.

The improved illuminating device comprises a molded transparent plastic light track 1 that is secured to a plate 2, also of plastic but not transparent, that is installed in an opening 3 in a shell 4 forming part of the housing of the weighing scale. The shell 4 in cooperation with a generally similar shell 5 constitute the housing for enclosing a rotatable scale chart 6 upon which weight and value indicia are printed. The chart 6 is rotated by a load counterbalancing mechanism so that the indicia on the chart when read against a reading line 7 on the customer's side or a similar reading line on the merchant's side indicate the magnitude of the load and, on the merchant's side, the value of the load being weighed. A lens assembly 8 mounted on the merchant's side of the housing 5 provides magnified images of the weight and value indicia.

The chart area immediately beneath the reading line 7 is illuminated with light obtained from a light bulb 9 and transmitted through the light track 1 until it is spilled through the beveled sides of a conical hole 10 molded in the light track 1. The light that spills into the hole 10 is directed generally toward the chart 6 so as to provide brilliant illumination thereof. A transparent recessed portion of the plastic cover plate 2 overlying the hole 10 permits observation of the indicia on the chart 6.

Light that passes within the light track 1 and past the sides of the hole 10 is spilled through a second tapered or beveled hole 11 located at the upper end of the light track 1. This light spilled through the hole 11 illuminates that area of the chart 6 lying beneath an alternative position of the reading line 7. In this embodiment the light from the hole 11 is used to back light a decorative translucent insert 12 fitted into the upper transparent recess of the plate 2.

If the reading line 7 is located beneath the upper transparent recess, as it is when the scale is to be installed on a low counter, the translucent decorative is mounted in the cover plate 2 over the first or lower beveled hole 10.

The details of the assembly of the cover plate 2, the light track 1 and a mask 13 is illustrated in Figure III. The cover plate 2 is designed to be a fairly close fit in the housing shell 4 and is provided with metallic clips 14 and 15 located along its upper and lower edges respectively. The clip 14 along the upper edge has a first section 16 that engages the outer surface of the cover plate 2. It is then bent over the top edge of the plate 2 and into the interior of the shell 4 where it has four ears 17 turned upwardly to engage a lip 18 formed in the housing shell 4 to hold the clip in position. It also includes an inwardly and downwardly extending lip 19 that engages the upper end of the light track 1.

The lower lip 15 includes a lip engaging the outer lower surface of the cover plate 2, and a pair of ears 20 that fit over a lip 21 of the housing shell 4 to hold the plate 2 in position. Two horizontal ears 22 are bent upwardly to grasp laterally extending lugs 23 of the light track 1 so that it is held securely against the plate 2.

The outer face of the light track 1 has a raised rim 24 surrounding each of the openings and providing a mounting surface to rest against the interior surface of the plate 2. This provides the separation required between the cover plate 2 and the light track 1 so that light is not lost from the light track 1 into the plate 2.

This arrangement of a molded transparent light track having a pair of openings located over selected areas of the chart provides a simple method of illuminating these areas as well as providing attractive back illumination for a translucent decorative piece or trade-mark insert.

Various modifications and shape and mounting arrangements may be made without departing from the spirit and scope of the invention.

Having described the invention, we claim:

1. In a weighing scale, in combination, a cylindrical chart, a housing portion that conforms closely to the chart over a portion thereof which is to be displayed to an observer, a light source positioned in an adjacent portion of the housing, a body of transparent material that has a curved form to match the cylindrical chart and that is interposed between the chart and the closely conforming portion of the housing, said body having an edge thereof in light receiving relation to said light source, said transparent body having an opening cut therethrough to expose the selected portion of the chart and having the edges of the opening beveled toward the chart whereby light transmitted through the body is directed onto the selected portion of the chart, and a cover plate having a window, said cover plate closing an opening in the housing overlying said transparent body with the window registering with the opening in said transparent body.

2. In a weighing scale, in combination, a cylindrical chart, a housing portion that conforms closely to the chart over a portion thereof which is to be displayed to an observer, a light source positioned in an adjacent portion of the housing, a body of transparent material that has a curved form to match the cylindrical chart and that is interposed between the chart and the closely conforming portion of the housing, said transparent body having an edge thereof in light receiving relation to said light source, said transparent body having an opening over the area to be displayed and having beveled edges of the opening facing such area so that light transmitted through the body is directed onto the area to be displayed, said housing having an opening over the area to be displayed and a cover plate having a window registering with the opening in the transparent body, and means on said cover plate for supporting the transparent body.

3. In a weighing scale, in combination, a cylindrical chart, a housing portion that conforms closely to the chart over a portion thereof which is to be displayed to an observer, a cover plate that covers an opening in the closely conforming housing portion, said cover plate having a window exposing the chart area to be displayed, means for removably attaching the cover plate to the housing, a member of transparent material that is attached to the cover plate, said member having a shape to conform to the space between the cover plate and the chart and being interposed between the cover plate and the chart, the member having a generally tapered opening that opens toward the chart and that registers with the window and having a generally straight and smooth lower edge located at substantially the same level as the bottom of the chart, and a light source positioned in said housing adjacent the edge of the transparent plate.

4. In a weighing scale, in combination, a cylindrical chart, a housing portion that conforms closely to the chart over a portion thereof which is to be displayed to an observer, a cover plate for covering an opening of the housing and overlying the area to be displayed, a plurality of transparent sections in said cover plate having one of which transparent sections serves as a window over the chart, a transparent molded member attached to the cover plate and interposed between the cover plate and the chart, said member having a curved configuration to match the cylindrical chart and a lower portion that extends out of the narrow space between the chart and housing, a light source mounted in the housing and adjacent the lower edge of the member, said member having a hole therethrough in registery with each of the transparent window sections and each hole having beveled sides facing the chart for directing light from the light source onto the chart and a decorative piece set into that one of the transparent sections that is not used for viewing the chart.

JOHN M. LITTLE.
CECIL G. BLANK.

REFERENCES CITED

The following references are of record in the file of this patent:

UNITED STATES PATENTS

| Number | Name | Date |
|---|---|---|
| 1,068,504 | King | July 29, 1913 |
| 1,715,074 | Platten | May 28, 1929 |
| 2,261,978 | Dircksen | Nov. 11, 1941 |
| 2,309,060 | Glaser | Jan. 19, 1943 |
| 2,333,492 | Ridge | Nov. 2, 1943 |
| 2,507,035 | Maynard | May 9, 1950 |